United States Patent
Kwan (10) Patent No.: US 8,584,951 B2
(45) Date of Patent: *Nov. 19, 2013

(54) APPARATUS, METHOD AND SYSTEM FOR EXTRACTING PIXEL DATA FROM AN IMAGE CAPTURE DEVICE

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 443 days.

This patent is subject to a terminal disclaimer.

(21) Appl. No.: 12/332,622

(22) Filed: Dec. 11, 2008

(65) Prior Publication Data

US 2010/0147950 A1  Jun. 17, 2010

(51) Int. Cl.
*G06K 19/06* (2006.01)
(52) U.S. Cl.
USPC ............. 235/462.25; 235/462.12; 235/383
(58) Field of Classification Search
USPC .......... 235/380, 383, 462.11, 462.12, 462.18, 235/462.24, 462.25, 462.28, 462.41
See application file for complete search history.

(56) References Cited

U.S. PATENT DOCUMENTS

| | | | |
|---|---|---|---|
| 6,580,456 B1 * | 6/2003 | Jacobs | 348/312 |
| 7,051,939 B2 | 5/2006 | Hammer | |
| 7,232,063 B2 * | 6/2007 | Fandel et al. | 235/383 |
| 7,948,533 B2 * | 5/2011 | Koseki | 348/243 |
| 2002/0158132 A1 | 10/2002 | Chang | |
| 2004/0052431 A1 * | 3/2004 | Locker et al. | 382/296 |
| 2006/0278712 A1 | 12/2006 | Olmstead | |
| 2007/0284448 A1 * | 12/2007 | Wang | 235/462.45 |
| 2011/0019025 A1 * | 1/2011 | Koseki | 348/222.1 |

* cited by examiner

*Primary Examiner* — Daniel St Cyr
(74) *Attorney, Agent, or Firm* — Harden E. Stevens, III (57) ABSTRACT

An image capture device, method and system where pixel data captured by the image capture device is read from the device in logical pixel rows. A logical pixel row is an externally defined row of pixels where the pixels that comprise the logical pixel row are read from parts of multiple physical rows of pixels. Logical pixel rows are at an angle to the physical rows of pixels that comprise the pixel array of the image capture device.

13 Claims, 5 Drawing Sheets

APPARATUS, METHOD AND SYSTEM FOR EXTRACTING PIXEL DATA FROM AN IMAGE CAPTURE DEVICE

REFERENCE TO RELATED APPLICATIONS

Reference is directed to the following copending United States patent applications, the entire disclosure of each of which is hereby incorporated herein by reference:

"Image Scanner for Passby Barcode Scanning", S. P. Kwan, application Ser. No. 11/470,645 filed Aug. 7, 2006.

TECHNICAL FIELD

An apparatus, method and system described herein relates generally to improvements to an image capture device. More particularly, the invention relates to improving the speed for reading a logical row of pixels where the logical row of pixels is not aligned with the physical pixel structure of the image capture device.

BACKGROUND

Bar code scanners are used in a wide variety of applications that rely on bar codes to store information. Industries such as retail, airline, self-service, automotive, parcel delivery, pharmaceutical, healthcare and others use bar codes to provide inventory control, customer identification, item tracking, security and many other functions. A typical bar code is comprised of a number of bars separated by spaces. Information is encoded on a bar code by varying the width of the bars and spaces. When a bar code is placed within the field of view of a bar code scanner, the scanner will detect, analyze and decode the bars and spaces comprising the bar code to retrieve the information encoded wherein. This operation is also called scanning or reading a bar code. The information encoded on a bar code is usually a sequence of numeric or alphanumeric numbers (e.g., a Universal Product Code (UPC) or European Article Number (EAN)).

An imaging bar code scanner (also referred to as an image scanner) reads a bar code by capturing a digital image of the bar code and then processing the image to detect and decode the bar code. It is advantageous for the bar code scanner to successfully read all bar codes presented to the scanner on the first pass of each bar code by the scanner. This is known as a successful first pass read. Successful first pass reads of bar codes helps to maintain a good workflow at the checkout station and speeds up the overall checkout process. A high first pass read success rate has also been found to reduce stress on the person operating the scanner. This is particularly true if the operator is a customer operating a self-checkout terminal.

High performance passby barcode scanners based upon image capture and image processing technology have been slow to be adopted in passby scanning environments. In a retail environment, an image scanner must achieve a passby speed of 30 to 50 inches per second. The image scanners on the market today have not proved capable of such speeds, which is why laser based barcode scanners dominate the passby scanning environments.

One important barrier that has prevented image scanners from reaching such high passby speeds is the large amount of pixel information involved with each image and the time required to transfer, process, and decode pixel information captured by an image capture device. Current image capture devices have limited methods for reading captured image data. As a result, more data is read from the image capture device than is needed.

Therefore, it would be desirable to provide an image capture device that does not suffer from these problems.

BRIEF DESCRIPTION OF THE DRAWINGS

The invention, in accordance with preferred and exemplary embodiments, together with further objects and advantages thereof, is more particularly described in the following description taken in conjunction with the accompanying drawings in which like reference characters designate the same or similar parts throughout the several views and wherein.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
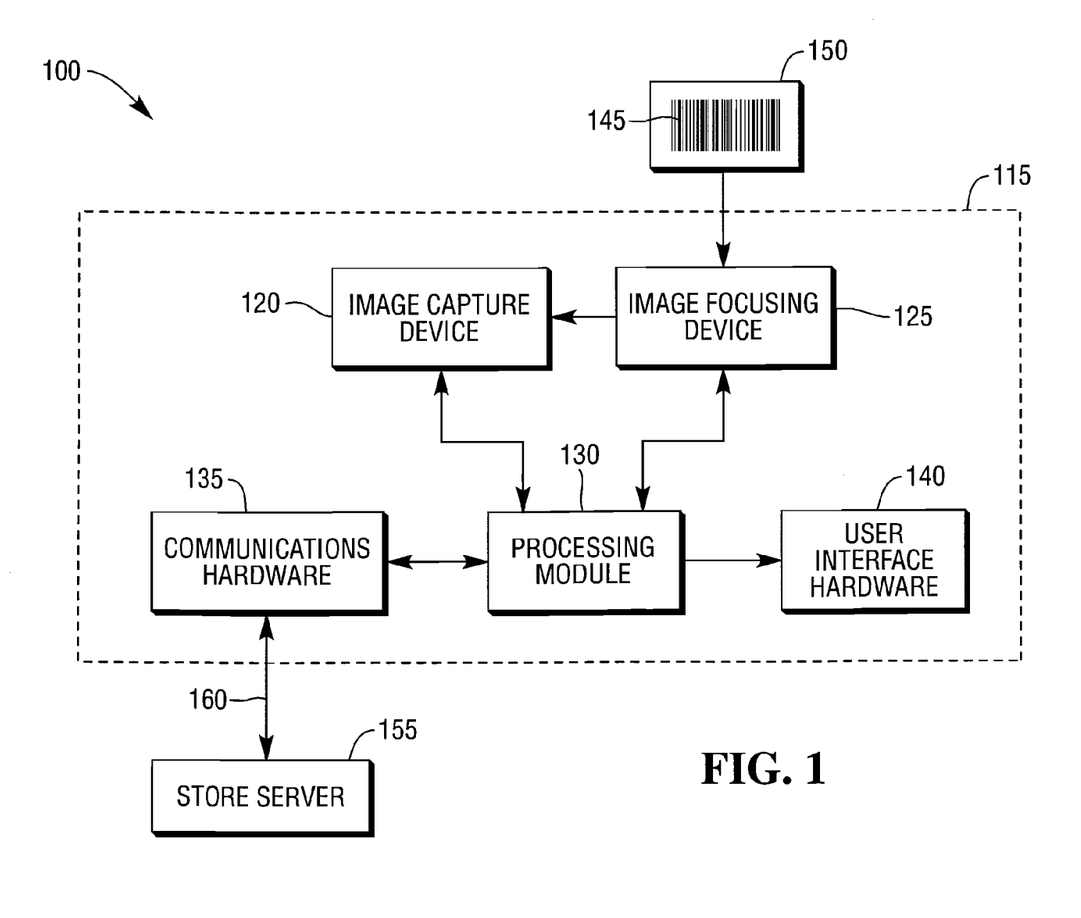
FIG. 1 is a high level block diagram illustrative of an embodiment of an image scanning system.

With reference to FIG. 1, there is provided a high level illustration, in block form, of an embodiment of an image scanning system 100, which is used to scan a bar code 145. The image scanning system 100 comprises an image scanner 115, a store server 155 and a bar code 145 printed on a label 150. The image scanner 115 communicates with the store server 155 over a computer data network 160. The network 160 can be a wired network (e.g., an Ethernet network) or wireless network (e.g., an IEEE 802.11G based network) or a combination of both. In some embodiments, the store server 155 is physically removed from the store where the image scanner 115 is located and communicates with the image scanner 115 over the Internet or a wide area network or a combination of these or different types of networks. In some embodiments, multiple image scanners 115 communicate over the data network 160 to the store server 155.

The image scanner 115 includes an image-focusing device 125 that receives an image and focuses the image onto an image capture device 120. The image scanner 115 is further comprised of a processing module 130, user interface hardware 140, and communications hardware 135. The processing module 130 comprises at least one processor, memory, stored instructions and control and interface hardware to control the other devices and modules of the image scanner 115. The processing module 130, by executing the stored instructions, controls the hardware devices and modules that comprise the image scanner 115 or are connected to the image scanner 115. In addition, the stored instructions cause the processor to: process data such as an image that is captured by the image capture device 120, control the communications hardware 135 to implement protocols used on the data network 160 and implement other software features and functions of the image scanner 115. In some embodiments, the store server 155 sends the image scanner 115 updates to the stored instructions or to the operating parameters of the image scanner 115. These updated stored instructions are stored in the image scanner 115 and then executed as required.

Image capture device 120 converts light reflected from bar code 145 into electrical signals. The source of the reflected light may be ambient light or light from an illumination device if sufficient ambient light is unavailable. The image capture device 120 is a silicon-based device with both optical and integrated circuits and may be fabricated as a complimentary metal oxide semiconductor (CMOS) integrated circuit. Image capture device 120 may include a charge coupled device (CCD) or a CMOS device.

Image capture device 120 captures an optical image, focused on it's surface, by converting the optical image to an electronic digital image comprising pixel information organized into rows and columns. The time required to read all of the raw pixel data from the image capture device 120 is relatively long compared to the time required to simply capture the digital image in the image capture device 120.

Figure 2:
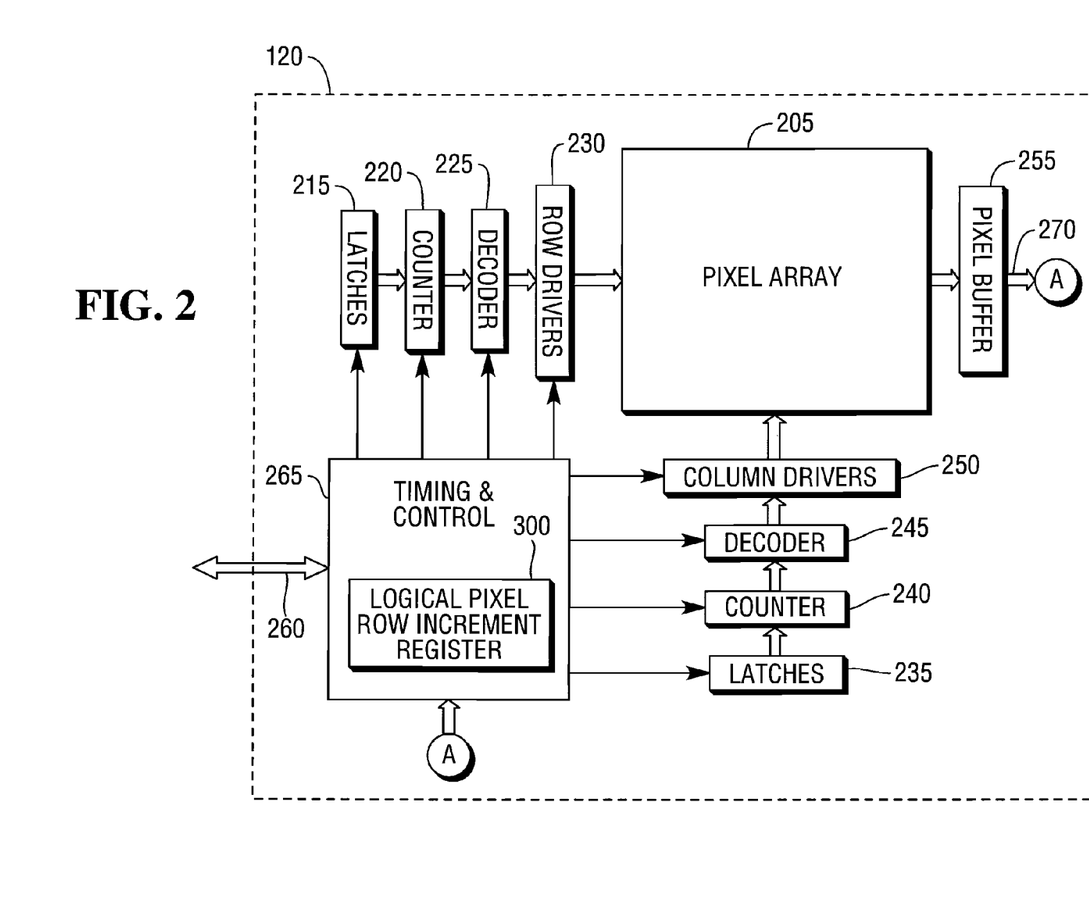
FIG. 2 is a high level block diagram illustrative of an embodiment of an image capture device.

With reference to FIG. 2, there is provided a high level block diagram of an image capture device 120. In this embodiment, the image capture device 120 is implemented as a CMOS device. The pixel array 205 defines the optically active area of the image capture device 120 and is where light or photon energy is converted into electric energy and stored as individual pixel data. An individual pixel contains data wherein the magnitude of the data is proportional to the total amount of photon energy striking a given area of the pixel array 205 integrated over a period of time. The pixels are physically organized into rows and columns. Timing and control logic 265 controls the operations of the image capture device 120 including capturing an image and reading pixel data from the pixel array 205 that represent the captured image. External interface 260 provides access to and control of the timing and control logic 265 to external devices (i.e., a processor or specialized hardware designed or programmed to process data from the image capture device 120). The external interface 260 is also used to receive commands from the external device and to send and receive data, including pixel data. Pixel data, captured by the image capture device 120, is transferred from the pixel array 205 to a pixel buffer 255 and then transferred externally through the external interface 260 when an external device signals it is ready to except the data. The external interface 260 interfaces with a data/control bus (not shown) that is external to the image capture device 120. The timing and control logic 265 manages the interaction with the data/control bus and the external device or devices.

A command to read-out all pixel data from the pixel array 205 causes the timing and control logic 265 to load the row latches 215 with the first row number of the pixel array 205 and the column latches 235 with the first column number of the pixel array 205. The row latches 215 drive a row counter 220 which increments the row number on command from the timing and control logic 265 to allow each row of the pixel array to be selected in it's turn or as needed. The output of the row counter 220 drives a row decoder 225, which generates a select row signal corresponding to a single row in the pixel array 205. The output of the row decoder 225 connects to the row drivers 230, which buffers and transmits a row select signal to the pixel array 205 to select a single row of pixel data. The column latches 235 drive a column counter 240, which will increment the column number on command from the timing and control logic 265 to allow each column in a row to be selected in it's turn or as needed. The output of the column counter 240 drives a column decoder 245, which generates a single column select signal corresponding to a single column in the pixel array 205. The output of the column decoder 245 connects to the column drivers 250, which buffers and transmits a column select signal to the pixel array 205. The row and column select signals combine to select a single pixel from the pixel array 205. The pixel data for the selected pixel is moved to the pixel buffer 255 where it is stored before being read by a computer or computer logic that is external to the image capture device 120. In some embodiments, the pixel buffer 255 buffers data from multiple pixels so that multiple pixels are read with each external access to the image capture device. This reduces the bus time needed to read the entire pixel array 205. In some embodiments, the pixel buffer 255 conditions or transforms the pixel data from an analog form to a digital form.

Less than all of the pixel data can be read by supplying the proper starting and ending locations for the row(s) and column(s) to be read. For example, a command to the timing and control logic 265 can request that only the first two rows are needed. In this example, the starting row location is 0 and the ending row location is 1. If all columns are to be read, the starting column location would be 0 and the ending column location would be the number of the last column. The number of the last row and column will very depending on the resolution of the image capture device 120. Larger devices will have more rows and columns. Once the parameters are set, the timing and control logic 265 will load the row and column latches 215, 235 and operate the counters so that the proper pixels are read from the pixel array 205. In this manner, a single command can read a block of pixel data where the same columns are read from one or more physical rows of the image capture device 120. Even though multiple rows can be read, the columns of pixels that are read are fixed (the same columns are read for each row read).

In addition to reading physical rows of pixel data, a single command can cause the timing and control logic 265 to read a logical row of pixels from the pixel array 205. A logical pixel row is a combination of pixel data where all of the pixel data does not reside sequentially on a single physical row of pixels and different columns can be read from each row. Put another way, the pixels that form a logical pixel row are taken from more than one physical row of pixels and from different columns. A logical pixel row can be created for example that runs diagonally from one corner of the pixel array 205 to the opposite corner and can be illustrated by a line placed diagonally over the pixel array 205. The logical pixel row would contain the pixels from each physical row in the pixel array 205 that fall completely or substantially underneath the diagonal line that represents the logical pixel row. The timing and control logic 265 is given a single command to read the pixel data that corresponds to the logical pixel row. The command includes information that identifies the pixels that are part of the logical pixel row so they can be retrieved from the pixel array 205. The retrieved pixel data is then buffered so that it can be read from the image capture device 120 by external devices. This method of reading pixel data greatly reduces the amount of time needed to read logical rows of pixels not aligned with physical rows of pixels and permits the creation of logical pixel rows that have almost any angular alignment with the physical rows of the pixel array 205. Being able to read multiple logical pixel rows, each at a different angle to the physical pixel rows, allows the image scanner 115 to quickly identify the presents of a bar code in a captured image, particularly if the longitudinal axis of the bar code is not parallel to the physical pixel rows of the pixel array 205.

In the above example of reading a diagonal logical pixel row, some prior art devices require reading all pixel data on every physical row just to access the one pixel required from each row. In other prior art devices, the devices could be programmed to read one or more pixels from a single row of pixels but a command would have to be issued for every row in the pixel array 205 that must be read. Both methods are time consuming and waste resources. Transferring only the pixel data belonging to the logical pixel row greatly reduces the amount of data that must be transferred and time and resources involved in the transfer. Accomplishing the transfer of a logical pixel row using a single read command to the image capture device 120 instead of multiple commands also reduces the time required to read a logical pixel row.

A logical pixel row can be defined mathematically by a "point-slope" equation. The point-slope equation uses a two dimensional point $(x_1, y_1)$ that a line passes through and the slope (m) of the line to define the line. The generic form of the point-slope equation is $y-y_1=m(x-x_1)$. Using a single known location of a line defined by two coordinates $(x_1, y_1)$ and the slope of the line, a line representing the location of the logical pixel row can be defined and superimposed across the pixel array 205 to determine which physical pixels comprise the logical pixel row. These physical pixels are then read from the pixel array 205. In some embodiments, the timing and control logic 265 contains arithmetic logic and software capable of performing the math required to identify the physical pixels that comprise a logical pixel row. The command to read a logical pixel row would include a coordinate $(x_1, y_1)$ and a slope (m). Using this information, the timing and control logic 265 would calculate the physical pixels that comprise the logical pixel row. However, in some embodiments, a simplified approach is used that requires less hardware and computing time for the timing and control logic 265. This approach is further discussed below and illustrated using FIGS. 3, 4 and 5.

Figure 3:
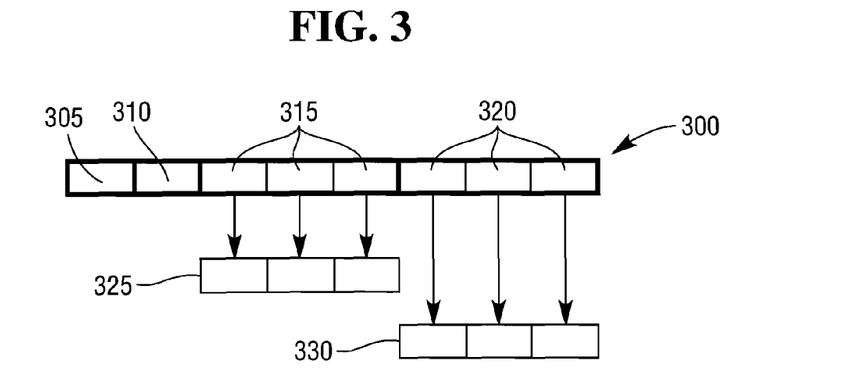
FIG. 3 is a high level block diagram illustrative of an increment register and associated logic.

With reference to FIG. 3, there is provided a high-level block diagram of an increment register 300 used to identify the location of physical pixels that comprise a logical pixel row. The timing and control logic 265 uses information in the increment register 300 to define a proximate line through the pixel array 205 and thus identify the physical pixels that comprise the logical pixel row. The increment register 300 is divided in the four fields: slope direction flag 305, increment direction flag 310, first cycle and second cycle. Each field comprises one or more data bits to represent the information stored in that field. The first field of the increment register 300 is the slope direction flag 305. The slope direction can be a "0" or "1". A slope direction of "0" indicates that the slope is to the right of a point and has a positive slope value. A slope direction of "1" indicates that the slope is to the left of a point and has a negative slope value. The second field of the increment register 300 is the increment direction flag 310, which defines a direction in the pixel array 205 where movement in the defined direction is determined by the value contained in the two cycle fields. An increment direction of "0" indicates a horizontal direction (moving across columns) and an increment direction of "1" indicates a vertical direction (moving across rows). The direction that is not selected by the increment direction flag 310 is always changed by one after each increment/decrement cycle in the selected direction.

Continuing with FIG. 3, the last two fields are named first cycle field 315 and second cycle field 320. These fields contain the number of pixels that are to be selected as part of the proximate line. The value of the first cycle field 315 is transferred to counter 325 and the value of the second cycle field 320 is transferred to counter 330. The timing and control logic 265 uses both counters 325, 330 to determine how many pixels to select. The timing and control logic 265 also uses both counters 325, 330 to control the row counter 220 or the column counter 240 depending on the value of the increment direction flag 310. Incrementing the row counter 220 or the column counter 240 causes the desired pixel in the pixel array 205 to be selected and read.

Other embodiments of the increment register 300 have fields with different sizes and can have additional fields or fields with different types of data, all used to define a logical pixel row.

Figure 4:
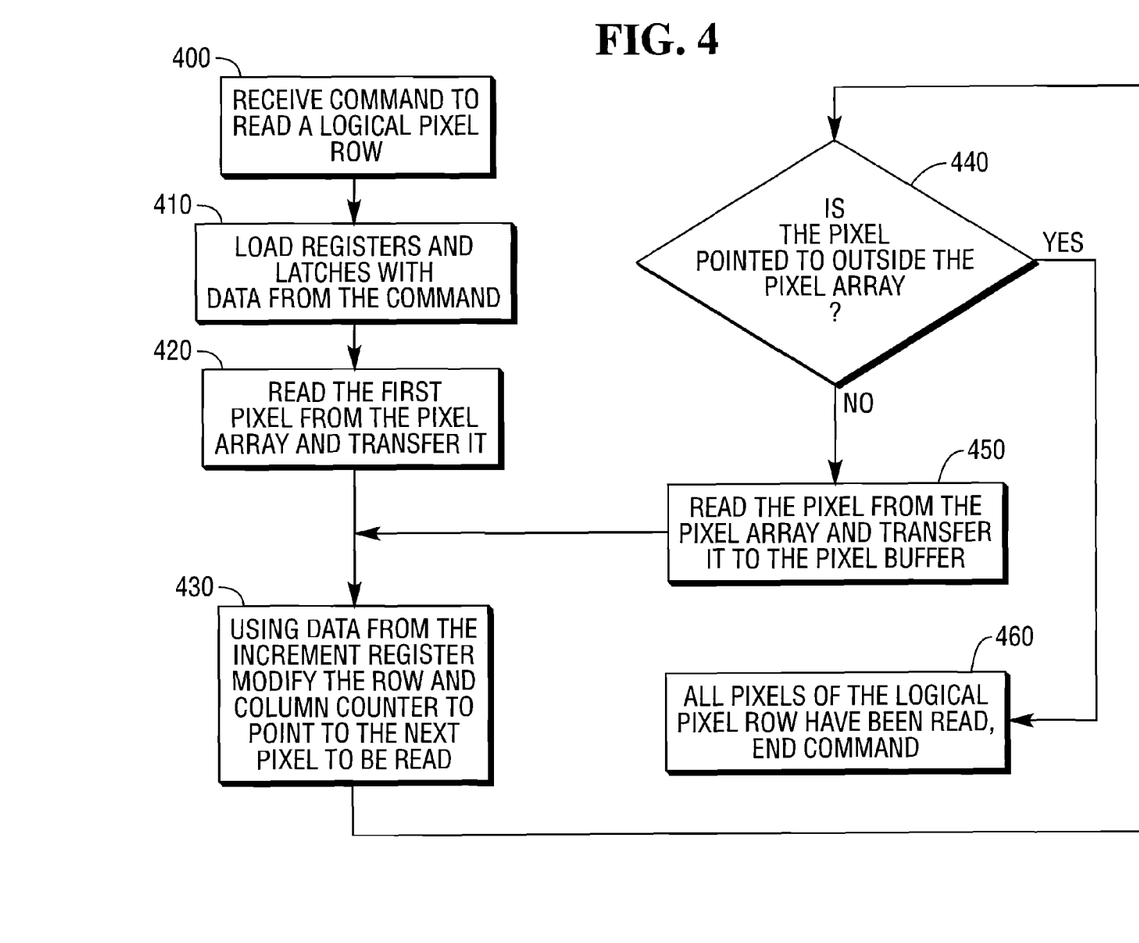
FIG. 4 is a high level flow diagram of an embodiment of the present invention.

With reference to FIG. 4, there is provided a high level flow diagram depicting the method of reading physical pixels that comprise a logical pixel row. In step 400, the image capture device 120 receives a command to read a logical pixel row. The command is received by the timing and control logic 265 from an external source. The command comprises the information needed to determine which physical pixels from the pixel array 205 comprise the logical pixel row.

In step 410, the timing and control logic 265 loads the row latches 215, column latches 235 and increment register 300 with values included in the command or values calculated from information provided in the command. After the increment register 300 is loaded, the value in the first cycle field 315 is moved to counter 325 and the value in the second cycle field 320 is moved to counter 330.

In step 420, the first physical pixel is read from the pixel array 205 using the values loaded in the row and column latches 215, 235. The pixel data is transferred to the pixel buffer 255 for temporary storage.

In step 430, the values stored in the row counter 220 and the column counter 240 are modified based on the values stored in the increment register 300 so that the next pixel in the logical pixel row is selected from the pixel array 205. The operation to modify the values stored in the row counter 220 and column counter 240 can include incrementing the value, decrementing the value or leaving the value unchanged. The values stored in the fields of the increment register 300 will determine the proper operation to take for each counter. The operation of the cycle fields of the increment register 300 is further described below in the pixel selection process.

In step 440, a check is made to determine if the value in either the row counter 220 or the column counter 240 has exceeded the physical bounds of the pixel array 205. If the value in either of the counters has exceeded the bounds, then all pixels comprising the logical pixel row have been read and the command is complete (step 460). If the values in both counters have not exceeded the bounds, then the pixel data currently pointed to by the counters is transferred to the pixel buffer 255 for temporary storage. The pixel buffer 255 can store data from multiple pixels at one time. In this way, an external device can, with a single bus read operation, read data for multiple pixels.

The process of addressing and reading all the pixels from the pixel array 205 is called the pixel selection process and is controlled by the timing and control logic 265. Prior to the start of the pixel selection process, the row latches 215 and column latches 235 are loaded with the starting location of the first physical pixel to be read as part of the logical pixel row. The process starts by moving the value of the first cycle field 315 to the counter 325. The physical pixel pointed to by the row latches 215 and column latches 235 is read. The value in counter 325 is decremented. If the value of the counter 325 is not zero, the timing and control logic 265 will cause the row counter 220 or column counter 240 to count either up or down based on the values of the slope direction flag 305 and the increment direction flag 310. One of the counters (row 220 or column 240) does not count based on the value of the increment direction flag 310. The new values in the row counter 220 and column counter 240 cause a new physical pixel to be selected and read from the pixel array 205. This process continues until the value in the counter 325 reaches zero. The row counter 220 and column counter 240 are separately either incremented or decremented based on the slope direction flag 305. The timing and control logic 265 then transfers the value in the second cycle field 320 to the counter 330. The process of selecting physical pixels continues using the second cycle field and counter 330 in place of the first cycle field and counter 325. Once counter 330 reaches zero, the process repeats using the first cycle field again until all physical pixels that comprise the logical pixel row are read from the pixel array 205.

In other embodiments, different methods of identifying physical pixels that comprise a logical pixel row are implemented. However, in each method a single command causes the image capture device 120 to read all physical pixels that comprise a logical pixel row from the pixel array 205. In some cases, additional commands are used to set starting values and parameters but only a single command to required to cause the image capture device 120 to read and make available all pixels that comprise a logical pixel row. It should also be noted, that an external device can issue multiple data bus read commands that transfer buffered pixel data from the image capture device 120 to an external location. A data bus read command is not the same as a higher-level command sent to the image capture device requesting the reading of all pixels in a logical pixel row. Data bus read commands simple transfer buffered pixel data that resulted from a high level command to read all pixels that comprise a logical pixel row.

Figure 5:
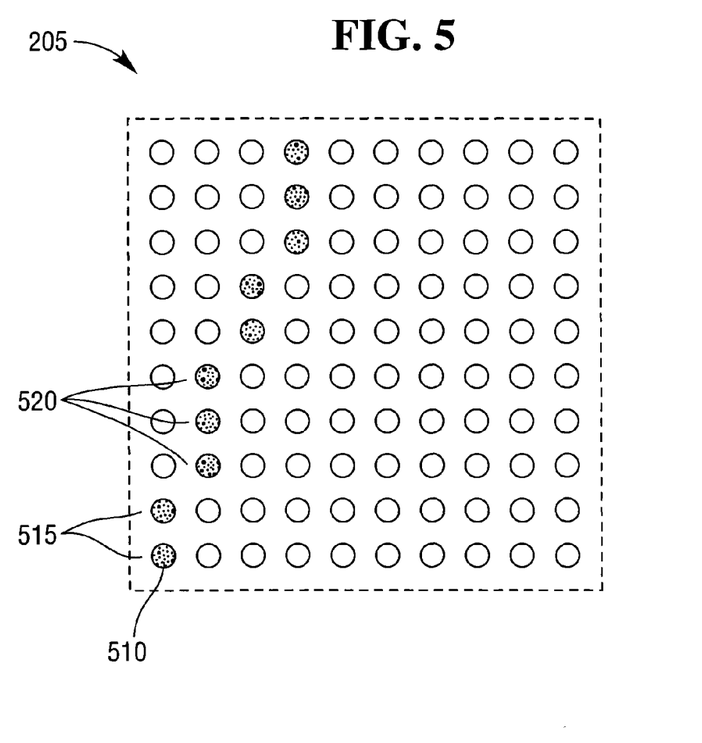
FIG. 5 is a partial view of the pixel array with an example of a logical pixel row.

With reference to FIG. 5, there is provided an example of a logical pixel row selected in a partial view of the pixel array 205. The shaded pixels represent the pixels selected as part of the logical pixel row and read from the pixel array 205. The value of the increment register 300 used to select this logical pixel row is "01010011". The slope direction flag (left most bit of the register) is "0", which means the slope, is to the right. The increment direction flag (second bit from the left) is "1", which means the pixels will be selected in the vertical direction using the values of the cycle fields. The first cycle field is "010" or the decimal number "2". The second cycle field is "011" or decimal number "3". In the example, the starting pixel point 510 is row 0, column 0. The slope direction flag 305 indicate the line will slope to the right and the increment direction flag 310 indicates that the selected pixels will be in the vertical direction. The first cycle field 315 indicates that two pixels are selected and these first two pixels 515 are shaded. Since the increment direction is vertical, the horizontal direction is incremented by one after the first two pixels are selected. Next, the second cycle field 320 indicates that three pixels are to be selected. The three pixels 520 are selected. The horizontal direction is incremented by one again and the sequence is repeated again using first cycle field value 315. The sequence of selecting physical pixels continues until the edge of the pixel array 205 is reached.

The logical pixel row shown in FIG. 5 represents a line that forms a 68.2° angle from the physical rows of the pixel array 205. A second logical pixel row (not shown) created using increment register 300 value of "01001001" would form a 45° angle from the rows of the pixel array 205. By varying the values of the increment register 300, a plurality of logical pixel rows can be defined forming almost any angle to the rows of the pixel array 205. Once the physical pixels comprising a logical pixel row are identified, the physical pixels data is read from the pixel array 205, buffered and transferred externally.

While the invention is disclosed in the context of an image capture device using a point-slope method to define a logical pixel row, it will be recognized that a wide variety of implementations may be employed by a person of ordinary skill in the art consistent with the above discussion and the claims, which follow below. In addition, the image capture device 120 can be used in other functions not associated with bar code recognition.

What is claimed is:

1. An image capture device comprising:
a pixel array organized as a plurality of rows and columns where each pixel represents a portion of a captured image;
an external interface for receiving and sending commands and data to the image capture device;
timing and control logic to receive commands from the external interface and control the image capture device; and
wherein a single command to read a logical pixel row causes the timing and control logic to identify and transfer to the external interface a plurality of pixels comprising the logical pixel row, where the plurality of the pixels are read from a plurality of rows and columns in the pixel array and where over the plurality of rows at least one column is read in one of the plurality of rows but not read in another of the plurality of rows.

2. The device of claim 1, wherein the command to read a logical pixel row includes information that defines the pixels in the pixel array that comprise the logical pixel row.

3. The device of claim 2, wherein the information includes the location of the first pixel to be read.

4. The device of claim 3, wherein the information further includes point-slope information that defines the remaining pixels that comprise the logical pixel row.

5. The device of claim 1, wherein the plurality of pixels identified and transferred to the external interface contains all pixels that comprise the logical pixel row.

6. A computer implemented method for use in an image capture device to read an entire logical pixel row, the method comprising:
receiving a command to read the entire logical pixel row from a pixel array in the image capture device where the pixels of the pixel array are organized in rows and columns and pixels that comprise the logical pixel row reside within a plurality of rows and columns and where over the plurality of rows at least one column is read in one of the plurality of rows but not read in another of the plurality of rows;
identifying in a pixel array the first pixel comprising the logical pixel row;
transferring the data of the first pixel to an external interface; and
identifying in the pixel array a subsequent pixel that comprises the logical pixel row, transferring the data of the subsequent pixel to the external interface and repeating the step until all pixels that comprise the logical pixel row are identified and transferred to the external interface.

7. The method of claim 6, wherein the command comprises information identifying all pixels from the pixel array that comprise the logical pixel row.

8. The method of claim 7, wherein the information uses a point-slope method to identify all the pixels from the pixel array that comprise the logical pixel row.

9. A image scanning system for reading optical codes, the system comprising:
a store server computer;
a network connected to the store server computer; and
an optical code image scanner connected to the network, the optical code image scanner comprises:

an image capture device to capture an image of the optical code, the device comprising:

a pixel array organized as a plurality of rows and columns where each pixel represents a portion of a captured image;

an external interface for receiving and sending commands and data to the image capture device;

timing and control logic to receive commands from the external interface and control the image capture device; and wherein a single command to read a logical pixel row causes the timing and control logic to identify and transfer to the external interface a plurality of pixels comprising the logical pixel row, where the plurality of the pixels are read from a plurality of rows and columns in the pixel array and where over the plurality of rows at least one column is read in one of the plurality of rows but not read in another of the plurality of rows.

10. The system of claim 9, wherein the command to read a logical pixel row includes information that defines the pixels in the pixel array that comprise the logical pixel row.

11. The system of claim 10, wherein the information includes the location of the first pixel to be read.

12. The system of claim 11, wherein the information further includes point-slope information that defines the remaining pixels that comprise the logical pixel row.

13. The system of claim 9, wherein the plurality of pixels identified and transferred to the external interface contains all pixels that comprise the logical pixel row.

* * * * *